(12) United States Patent
Hu et al.

(10) Patent No.: US 10,924,049 B2
(45) Date of Patent: Feb. 16, 2021

(54) CONTROL METHOD FOR OSCILLATING MOTORS AND AN OSCILLATING MOTOR

(71) Applicant: Jiankun Hu, Guangdong (CN)

(72) Inventors: Jiankun Hu, Guangdong (CN); Shunan Hu, Guangdong (CN); Feifan Hu, Guangdong (CN); Feiran Hu, Guangdong (CN)

(73) Assignee: Jiankun Hu, Shenzhen (CN)

( * ) Notice: Subject to any disclaimer, the term of this patent is extended or adjusted under 35 U.S.C. 154(b) by 0 days.

(21) Appl. No.: 16/607,717

(22) PCT Filed: Apr. 24, 2017

(86) PCT No.: PCT/CN2017/081717
§ 371 (c)(1),
(2) Date: Oct. 23, 2019

(87) PCT Pub. No.: WO2018/195726
PCT Pub. Date: Nov. 1, 2018

(65) Prior Publication Data
US 2020/0136545 A1 Apr. 30, 2020

(51) Int. Cl.
*H02P 25/032* (2016.01)
*A61H 13/00* (2006.01)
(Continued)

(52) U.S. Cl.
CPC ........... *H02P 25/032* (2016.02); *A61H 13/00* (2013.01); *A61H 21/00* (2013.01);
(Continued)

(58) Field of Classification Search
CPC ...... H02P 1/00; H02P 1/04; H02P 1/08; H02P 1/22; H02P 1/26; H02P 1/24; H02P 1/16;
(Continued)

(56) References Cited

U.S. PATENT DOCUMENTS 3,493,793 A * 2/1970 Niemela ............... H02K 33/06
310/29
3,636,391 A * 1/1972 Horner .................. H02K 33/14
310/24
(Continued)

FOREIGN PATENT DOCUMENTS

CN 1070359 A 3/1993
CN 203357478 U 12/2013
(Continued)

OTHER PUBLICATIONS

International Search Report of PCT Patent Application No. PCT/CN2017/081717 dated Jan. 24, 2018.

*Primary Examiner* — Antony M Paul

(57) ABSTRACT

Control method for oscillating motor and osculating motor The control unit is further used for storing the set pulse parameters, and outputting alternating pulses with corresponding pulse widths and frequencies according to the set pulse parameters, so that the oscillating arm oscillates in an oscillation mode corresponding to the pulse parameters; wherein the oscillation mode comprises at least one of a full-amplitude oscillation mode, a sub-amplitude oscillation mode, an in-situ shaking mode and a composite oscillation mode, wherein the composite oscillation mode is generated by superposition of the full-amplitude oscillation mode and the in-situ shaking mode, or is generated by superposition of the sub-amplitude oscillation mode and the in-situ shaking mode.

16 Claims, 5 Drawing Sheets

(51) Int. Cl.
*A61H 21/00* (2006.01)
*A61H 23/02* (2006.01)
*A61H 39/06* (2006.01)
*A61H 39/08* (2006.01)
*H02K 33/16* (2006.01)

(52) U.S. Cl.
CPC ......... *A61H 23/0218* (2013.01); *A61H 39/06* (2013.01); *A61H 39/08* (2013.01); *H02K 33/16* (2013.01); *A61H 2230/065* (2013.01)

(58) Field of Classification Search
CPC ...... H02P 1/28; H02P 1/38; H02P 1/40; H02P 1/426; H02P 1/46; H02P 1/52; H02P 3/00; H02P 7/00; H02P 7/06; H02P 7/03; H02P 7/29; H02P 7/30; H02P 21/0021; H02P 21/14; H02P 23/00; H02P 23/0027; H02P 23/14; H02P 25/00; H02P 25/022; H02P 25/024; H02P 25/032; H02P 25/034; H02P 25/08; H02P 25/06; H02P 27/00; H02P 6/006; H02P 8/005; H02K 33/18; H02K 33/16; H02K 33/10; A61H 23/02; A61H 23/223; A61H 23/065; A61H 21/00; A61H 39/06; A61H 39/08; A61H 13/00

USPC .......... 318/114, 115, 119, 135, 400.01, 700, 318/701, 721, 727, 400.14
See application file for complete search history.

(56) References Cited

U.S. PATENT DOCUMENTS

| | | | | |
|---|---|---|---|---|
| 3,812,389 A | * | 5/1974 | Bowerman | H02K 33/04 |
| | | | | 310/29 |
| 5,736,797 A | * | 4/1998 | Motohashi | H02K 33/16 |
| | | | | 310/36 |
| 2016/0248310 A1 | | 8/2016 | Elenga et al. | |

FOREIGN PATENT DOCUMENTS

| | | |
|---|---|---|
| CN | 105588314 A | 5/2016 |
| CN | 105598797 A | 5/2016 |
| CN | 105743319 A | 7/2016 |
| EP | 2420203 A2 | 2/2012 |
| JP | H10314671 A | 12/1998 |
| JP | 2001275332 A | 10/2001 |
| JP | 2006008401 A | 1/2006 |
| JP | 2008299297 A | 12/2008 |
| WO | 2017031964 A1 | 3/2017 |

* cited by examiner

CONTROL METHOD FOR OSCILLATING MOTORS AND AN OSCILLATING MOTOR

TECHNICAL FIELD

The invention relates to the field of motors, in particular to a control method for oscillating motors and an oscillating motor.

BACKGROUND

For traditional oscillating motor, such as Permanent magnet electric clipper (Publication No. CN1070359) and Oscillating rod of electric clipper (Publication No. CN203357478U), in order to ensure sufficient torque, coils must be energized with 220V AC, with a power of 8~12 watts. In addition, they use a fixed frequency of 220V AC for oscillating arm to oscillate, which is guaranteed by spring resonance, without spring resonance, the oscillating arm cannot oscillate back and forth.

Also, vibration drivers, such as JP2001275332A, whose drive also depends on spring resonance, its amplitude is the largest at resonance. If it deviates from this frequency, the amplitude will decrease and the torque will be unstable. There is no stable position when different-width pulses drive it to swing to another end.

Both types of oscillating motor rely on resonant springs to support the oscillating assembly in the central position, and fixed frequency alternating signals drive the oscillating assembly to resonate with the springs, that is, the oscillating frequency cannot be changed greatly.

SUMMARY

In order to solve the above problems, the present invention provides a control method for oscillating motors and an oscillating motor.

According to a first aspect, an embodiment provides a control method for osculating motors, the oscillating motor comprises a U-shaped magnetic yoke, a control unit, an oscillating arm oscillating around a fulcrum, a second magnetic yoke and four permanent magnets; the U-shaped magnetic yoke has a first support leg and a second support leg, and the first support leg and the second support leg are respectively wound with coils; the control unit is electrically connected with coils and produces alternating pulses to generate alternating magnetic poles on the end faces of the two supporting legs of the U-shaped magnetic yoke; the oscillating arm extends outward from the end face direction of the U-shaped magnetic yoke and is bounded by the fulcrum, the end of the oscillating arm close to the U-shaped magnetic yoke is an inner arm, the end of the oscillating arm away from the U-shaped magnetic yoke is an outer arm; the second magnetic yoke is installed at the end of the inner arm close to the U-shaped magnetic yoke; the permanent magnets are fixedly installed on the second magnetic yoke; the four permanent magnets are arranged side by side in sequence, they are: a first permanent magnet, a second permanent magnet, a third permanent magnet and a fourth permanent magnet, according to the arrangement order; the outer end faces of the first permanent magnet and the fourth permanent magnet are of the same polarity, and the outer end faces of the second permanent magnet and the third permanent magnet are of the same polarity; and the outer end faces of the first permanent magnet and the second permanent magnet are of the opposite polarity and arranged corresponding to the end face of the first support leg; the outer end faces of the third permanent magnet and the fourth permanent magnet are of the opposite polarity and arranged corresponding to the end face of the second support leg; there is an air gap between the end faces of the permanent magnets and their corresponding support legs, and alternating magnetic poles generated by the two supporting legs of the U-shaped magnetic yoke cause the permanent magnets, the second magnetic yoke and the oscillating arm to reciprocate;

the control method comprises the following steps:
setting pulse parameters;
the control unit outputs alternating pulses with corresponding pulse widths and frequencies according to the set pulse parameters, so that the oscillating arm oscillates in an oscillation mode corresponding to the pulse parameters; wherein the oscillation mode comprises at least one of a full-amplitude oscillation mode, a sub-amplitude oscillation mode, an in-situ shaking mode and a composite oscillation mode, wherein the composite oscillation mode is generated by superposition of the full-amplitude oscillation mode and the in-situ shaking mode, or is generated by superposition of the sub-amplitude oscillation mode and the in-situ shaking mode.

In one embodiment, the control unit outputs a first alternating pulse to cause the oscillating arm to reciprocate in a full amplitude oscillation mode; wherein the pulse width of the first alternating pulse is greater than or equal to the minimum pulse width Tb of the full-amplitude oscillation; the frequency of the first alternating pulse is greater than zero and less than or equal to the maximum alternating pulse frequency Fa of the full-amplitude oscillation.

In one embodiment, the control unit increases the frequency of the output first alternating pulse to accelerate the frequency of reciprocating oscillation of the oscillating arm.

In one embodiment, the control unit outputs a second alternating pulse to cause the oscillating arm to reciprocate in a sub-amplitude oscillation mode; wherein the pulse width of the second alternating pulse is greater than or equal to the minimum pulse width Tb of the full-amplitude oscillation; the frequency of the second alternating pulse is greater than the maximum alternating pulse frequency Fa of the full-amplitude oscillation, and is less than or equal to the frequency of Fb corresponding to the minimum pulse width Tb of the full-amplitude oscillation when the duty ratio of the alternating pulse is 100%, and $Fb=1/(2*Tb)$.

In one embodiment, the control unit increases the frequency of the output second alternating pulse to reduce the amplitude of oscillation of the oscillating arm.

In one embodiment, when the power supply voltage of the oscillating motor becomes smaller or the load of the oscillating motor becomes larger, the pulse width of the alternating pulse output by the control unit is increased.

In one embodiment, the control unit outputs a third alternating pulse to cause the oscillating arm to oscillate in the in-situ shaking mode; wherein the pulse width of the third alternating pulse is less than the minimum pulse width Tb of the full-amplitude oscillation, and is greater than or equal to the minimum pulse width Td of start oscillation; the frequency of the third alternating pulse is greater than 0, and less than or equal to the frequency Fd corresponding to the minimum pulse width Td of start oscillation when the duty ratio of the alternating pulse is 100%, and $Fd=1/(2*Td)$.

In one embodiment, the control unit increases the pulse width of the output third alternating pulse to increase the amplitude of oscillation of the oscillating arm.

In one embodiment, the control unit outputs a composite alternating pulse consisting of a fourth alternating pulse and a fifth alternating pulse, so that the oscillating arm reciprocates in a composite oscillation mode;

wherein the pulse width of the fourth alternating pulse is greater than or equal to the minimum pulse width Tb of the full-amplitude oscillation;

the pulse width of the fifth alternating pulse is less than the minimum pulse width Tb of the full-amplitude oscillation, and is greater than or equal to the minimum pulse width Td of start oscillation; the frequency of the fifth alternating pulse is greater than 0, and less than or equal to the frequency Fd corresponding to the minimum pulse width Td of start oscillation when the duty ratio of the alternating pulse is 100%, and Fd=1/(2*Td);

the fourth alternating pulse and the fifth alternating pulse form the composite alternating pulse in a form that positive and negative levels do not overlap each other in time sequence.

According to a second aspect, an embodiment provides an oscillating motor, the oscillating motor comprises a U-shaped magnetic yoke, a control unit, an oscillating arm oscillating around a fulcrum, a second magnetic yoke and four permanent magnets; the U-shaped magnetic yoke has a first support leg and a second support leg, and the first support leg and the second support leg are respectively wound with coils; the control unit is electrically connected with coils and produces alternating pulses to generate alternating magnetic poles on the end faces of the two supporting legs of the U-shaped magnetic yoke; the oscillating arm extends outward from the end face direction of the U-shaped magnetic yoke and is bounded by the fulcrum, the end of the oscillating arm close to the U-shaped magnetic yoke is an inner arm, the end of the oscillating arm away from the U-shaped magnetic yoke is an outer arm; the second magnetic yoke is installed at the end of the inner arm close to the U-shaped magnetic yoke; the permanent magnets are fixedly installed on the second magnetic yoke; the four permanent magnets are arranged side by side in sequence, they are: a first permanent magnet, a second permanent magnet, a third permanent magnet and a fourth permanent magnet, according to the arrangement order; the outer end faces of the first permanent magnet and the fourth permanent magnet are of the same polarity, and the outer end faces of the second permanent magnet and the third permanent magnet are of the same polarity; and the outer end faces of the first permanent magnet and the second permanent magnet are of the opposite polarity and arranged corresponding to the end face of the first support leg; the outer end faces of the third permanent magnet and the fourth permanent magnet are of the opposite polarity and arranged corresponding to the end face of the second support leg; there is an air gap between the end faces of the permanent magnets and their corresponding support legs, and alternating magnetic poles generated by the two supporting legs of the U-shaped magnetic yoke cause the permanent magnets, the second magnetic yoke and the oscillating arm to reciprocate;

the control unit is further used for storing the set pulse parameters, it outputs alternating pulses with corresponding pulse widths and frequencies according to the set pulse parameters, so that the oscillating arm oscillates in an oscillation mode corresponding to the pulse parameters; wherein the oscillation mode comprises at least one of a full-amplitude oscillation mode, a sub-amplitude oscillation mode, an in-situ shaking mode and a composite oscillation mode, wherein the composite oscillation mode is generated by superposition of the full-amplitude oscillation mode and the in-situ shaking mode, or is generated by superposition of the sub-amplitude oscillation mode and the in-situ shaking mode.

In one embodiment, the control unit is used for outputting a first alternating pulse to cause the oscillating arm to reciprocate in a full-amplitude oscillation mode; wherein the pulse width of the first alternating pulse is greater than or equal to the minimum pulse width Tb of the full-amplitude oscillation; the frequency of the first alternating pulse is greater than zero and less than or equal to the maximum alternating pulse frequency Fa of the full-amplitude oscillation.

In one embodiment, the control unit is used for outputting a second alternating pulse to cause the oscillating arm to reciprocate in a sub-amplitude oscillation mode; wherein the pulse width of the second alternating pulse is greater than or equal to the minimum pulse width Tb of the full-amplitude oscillation; the frequency of the second alternating pulse is greater than the maximum alternating pulse frequency Fa of the full-amplitude oscillation, and is less than or equal to the frequency Fb corresponding to the minimum pulse width Tb of the full-amplitude oscillation when the duty ratio of the alternating pulse is 100%, and Fb=1/(2*Tb).

In one embodiment, the control unit is used for outputting a third alternating pulse to cause the oscillating arm to oscillate in the in-situ shaking mode; wherein the pulse width of the third alternating pulse is less than the minimum pulse width Tb of the full-amplitude oscillation, and is greater than or equal to the minimum pulse width Td of start oscillation; the frequency of the third alternating pulse is greater than 0, and less than or equal to the frequency Fd corresponding to the minimum pulse width Td of start oscillation when the duty ratio of the alternating pulse is 100%, and Fd=1/(2*Td).

In one embodiment, the control unit is used for outputting a composite alternating pulse consisting of a fourth alternating pulse and a fifth alternating pulse, so that the oscillating arm performs reciprocating oscillation in a composite oscillation mode; wherein the pulse width of the fourth alternating pulse is greater than or equal to the minimum pulse width Tb of the full-amplitude oscillation; the pulse width of the fifth alternating pulse is less than the minimum pulse width Tb of the full-amplitude oscillation, and greater than or equal to the minimum pulse width Td of start oscillation; the frequency of the fifth alternating pulse is greater than 0, and less than or equal to the frequency Fd corresponding to the minimum pulse width Td of start oscillation when the duty ratio of the alternating pulse is 100%, and Fd=1/(2*Td); the fourth alternating pulse and the fifth alternating pulse form the composite alternating pulse in a form that positive and negative levels do not overlap each other in time sequence.

According to the above embodiments of the control method for oscillating motors and the oscillating motor, the control unit outputs alternating pulses with corresponding pulse widths and frequencies according to the set pulse parameters, so that the oscillating arm oscillates in an oscillation mode corresponding to the pulse parameters; wherein the oscillation mode comprises at least one of a full-amplitude oscillation mode, a sub-amplitude oscillation mode, an in-situ shaking mode and a composite oscillation mode, so that the oscillating motor can provide different oscillation modes according to different application scenarios, thus working as a multi-purpose function machine.

In full-amplitude oscillation mode, it has a stable position when it is driven to oscillate to both ends at 0-Fa frequency.

DETAILED DESCRIPTION OF EMBODIMENTS

Figure 1:
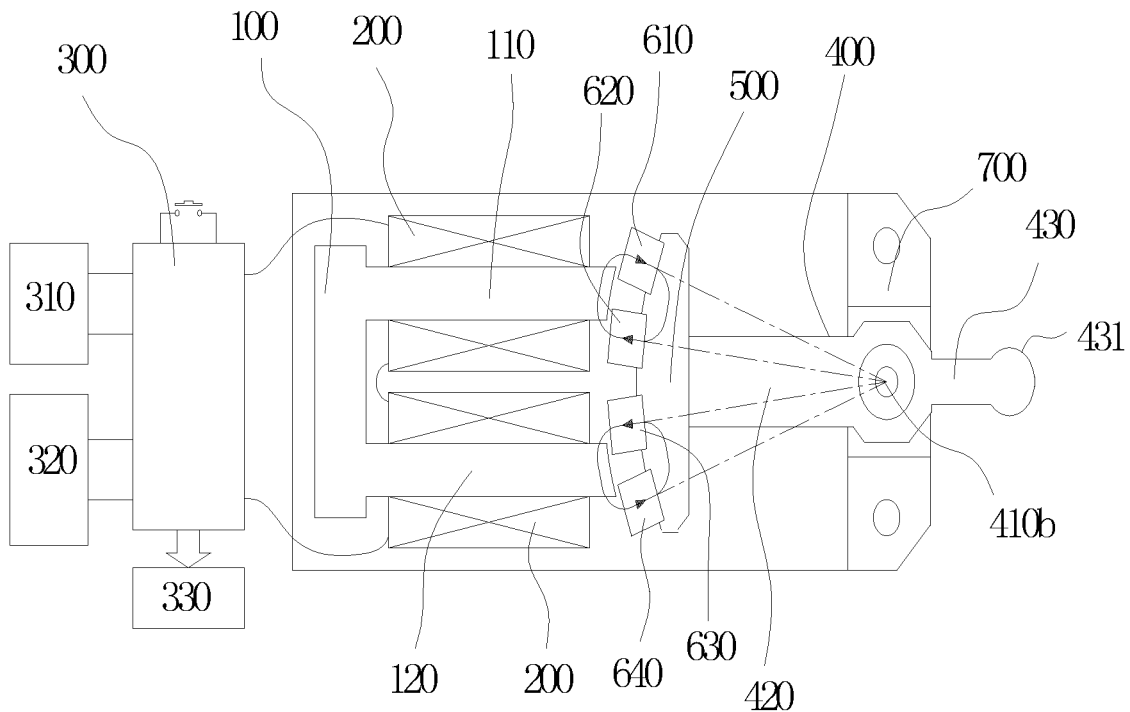
FIG. 1 is a structural schematic diagram of an embodiment of the oscillating motor of the present invention.

The present invention will now be described in further detail with reference to the accompanying drawings and specific embodiments. Like reference numerals refer to like elements in different embodiments. In the following embodiments, many details are described to make the application to be better understood. However, those skilled in the art can easily realize that some of the features may be omitted in different situations or may be replaced by other elements, materials and methods. In some cases, some operations related to this application are not shown or described in the specification, in order to prevent the core part of this application from being neglected by too many descriptions. It is not necessary for those skilled in the art to describe those operations in detail, and they can fully understand the related operations according to the description in the specification and the general technical knowledge in the field.

In addition, the features or operations described in the specification may be combined in any suitable manner to form various embodiments. At the same time, each step or action in the method description can also be changed or adjusted in sequence in a manner obvious to those skilled in the Art. Therefore, the various orders in the specification and drawings are only for the purpose of clearly describing a certain embodiment and do not intend to be a necessary order unless otherwise specified, in which a certain order must be followed.

The serial numbers assigned to parts herein, such as "first" and "second", are only used to distinguish the described objects and do not have any order or technical meaning. The singular terms "a", "an" and "the" include plural reference and vice versa unless the context clearly indicates otherwise. The term "connection" in this application includes direct and indirect connection unless otherwise specified.

The present invention provides a control method for oscillating motors and an oscillating motor. In order to explain the present invention more clearly, the basic structure of the oscillating motor of the present invention may be explained first by taking Embodiment 1 as an example.

Embodiment 1

Figure 2:
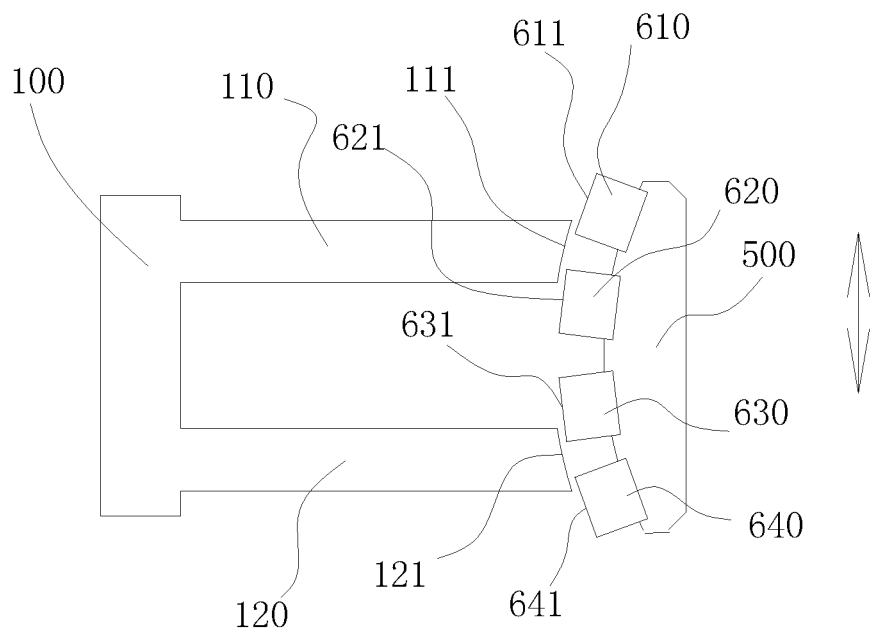
FIG. 2 is a schematic diagram of the cooperation between the permanent magnets and the supporting legs of the u-shaped magnet yoke in the embodiment shown in FIG. 1.

The oscillating motor disclosed in this embodiment can output a reciprocating oscillation motion, please refer to FIGS. 1 and 2 for its basic structure. The oscillating motor of this embodiment includes a U-shaped magnetic yoke 100, a control unit 300, an oscillating arm 400, a second magnetic yoke 500 and four permanent magnets (First permanent magnet 610, Second permanent magnet 620, Third permanent magnet 630 and Fourth permanent magnet 640), which will be described in detail below.

The U-shaped magnetic yoke 100 has a first support leg 110 and a second support leg 120, the first support leg 110 and the second support leg 120 are wound with coils 200 respectively.

The control unit 300 is electrically connected to the coils 200 and produces alternating pulses to generate alternating magnetic poles on the end faces 111 and 121 of the two legs of the U-shaped magnetic yoke 100.

An oscillating arm 400 oscillating around a fulcrum, the oscillating arm 400 extends outward from the end faces 111, 121 of the U-shaped magnetic yoke 100, and is bounded by the fulcrum. The end of the oscillating arm 400 close to the U-shaped magnetic yoke 100 is an inner arm 420, the end of the oscillating arm 400 away from the U-shaped magnetic yoke 100 is an outer arm 430.

The second magnetic yoke 500 (to distinguish it from U-shaped magnetic yoke 100, it is called second magnetic yoke 500) is installed at the end of inner arm 420 close to the U-shaped magnetic yoke 100.

The four permanent magnets are fixedly mounted on the second magnetic yoke 500 (e.g. glued). The four permanent magnets are distributed on the circumference with the fulcrum as the center of the circle, they are, first permanent magnet 610, second permanent magnet 620, third permanent magnet 630 and fourth permanent magnet 640, according to the arrangement order. The polarities of the radial end faces 611, 641 of the first permanent magnet 610 and the fourth permanent magnet 640 are the same, the polarities of the radial end faces 621, 631 of the second permanent magnet 620 and the third permanent magnet 630 are the same. And the polarities of the radial end face 611 of the first permanent magnet 610 and the radial end face 621 of the second permanent magnet 620 are opposite, and are arranged corresponding to the end face 111 of the first support leg 110. The radial end face 631 of the third permanent magnet 630 and the radial end face 641 of the fourth permanent magnet 640 are of the opposite polarity and are arranged corresponding to the end face 121 of the second support leg 120, and there is an air gap between the end faces of the four permanent magnets and the end faces of their corresponding support legs.

Wherein, "the four permanent magnets are distributed on the circumference with the fulcrum as the center of the circle" means that the radii from the four permanent magnets to the fulcrum are approximately equal, i.e. distributed radially along the oscillation center line.

The U-shaped magnetic yoke 100, osculating arm 400, second magnetic yoke 500 and permanent magnets are installed in housing 700, wherein the fulcrum of osculating arm 400 is an oscillating axle 410*b*. The osculating axle 410*b* is fixedly installed on the housing 700, and the oscillating arm 400 is sleeved on the osculating axle 410*b*. The housing 700 can be a housing dedicated to the motor or a housing of an electric appliance using the motor.

When the coils 200 are energized, all four permanent magnet will generate torque in the same direction of rotation. After being energized, if the first and third permanent magnets 610, 630 generate a same magnetic attraction force to the U-shaped magnetic yoke 100, then the second and fourth permanent magnets 620, 640 will generate a same magnetic repulsion force to the U-shaped magnetic yoke 100; when reverse current is applied, the first and third permanent magnet 610, 630 generate a same magnetic repulsion force to the U-shaped magnetic yoke 100, then the second and fourth permanent magnet 620, 640 will generate a same magnetic attraction force to the U-shaped magnetic yoke 100. Each leg of the U-shaped magnet yoke corresponds to two permanent magnets, this redundant design of the permanent magnets is a magnetic circuit design different from that of the prior art, so that the oscillating motor has larger torque than the existing motor with the same power, the applied magnetic flux is large, the driving power will decrease accordingly.

The four permanent magnets are simultaneously acted by a force of the U-shaped magnetic yoke 100 in a same oscillation direction, which can ensure that the oscillating arm 400 can realize the whole reciprocating oscillation process without external force.

Figure 3:
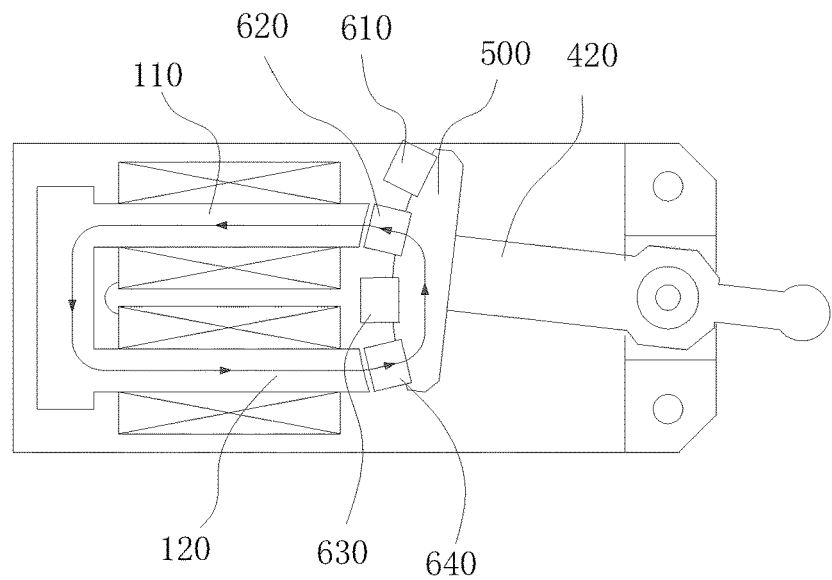
FIG. 3 is a schematic view of the embodiment shown in FIG. 1 in energized state.

Specifically, referring to FIGS. 1, 2 and 3, it is assumed that the end faces of the first permanent magnet 610 and the fourth permanent magnet 640 are N pole, and the end faces of the second permanent magnet 620 and the third permanent magnet 630 are S pole. When the coils 200 are energized, if the end face of the first support leg 110 is N pole and the end face of the second support leg 120 is S pole, then the N pole of the first support leg 110 will generate suction force to the S pole of the second permanent magnet 620 and repulsion force to the N pole of the first permanent magnet 610. Similarly, the S pole of the second support leg 120 will generate suction force to the N pole of the fourth permanent magnet 640 and repulsion force to the S pole of the third permanent magnet 630, thus the oscillating arm 400 oscillates from the position shown in FIG. 1 to the position shown in FIG. 3 to finish the first oscillation.

Figure 4:
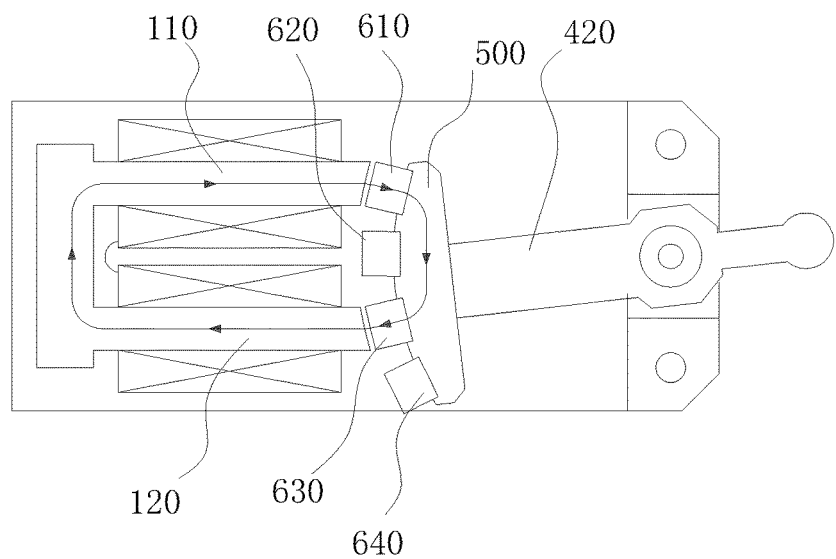
FIG. 4 is a schematic view of the embodiment shown in FIG. 1 in energized state opposite to FIG. 3.

When the current direction in the coils 200 changes, as shown in FIG. 4, at this point, the end face of the first support leg 110 is S pole and the end face of the second support leg 120 is N pole, then the S pole of the first support leg 110 will generate repulsion force to the S pole of the second permanent magnet 620 and suction force to the N pole of the first permanent magnet 610. Similarly, the N pole of the second support leg 120 will generate repulsion force to the N pole of the fourth permanent magnet 640 and suction force to the S pole of the third permanent magnet 630, thus the oscillating arm 400 oscillates from the position shown in FIG. 3 to the position shown in FIG. 4 to finish the second oscillation. This can be defined as a full-amplitude oscillation position, the separation of the four permanent magnets can increase the oscillation distance, and the four permanent magnets are consistent, only the installation directions are different, the magnetic induction intensity can be easily set according to the thickness and the width; the width of the supporting leg of the U-shaped magnetic yoke 100 corresponds to the permanent magnets, so that the oscillation distance does not need to be widened to increase the width of the supporting leg, and is also beneficial to increase the magnetic induction intensity of the U-shaped magnetic yoke 100; moreover, the two permanent magnets in the middle have little influence on the non-acting U-shaped yoke leg.

To sum up, coils 200 are connected to control unit 300, the control unit 300 produces alternating pulses with adjustable pulse width to generate alternating magnetic poles on the end faces of U-shaped magnetic yoke 100, so that the permanent magnets generate suction torque and repulsive torque, or repulsive torque and suction torque, to drive the oscillating arm 400 to oscillate, thereby driving the corresponding mechanical unit to oscillate by the oscillating arm 400. That is, the oscillating motor 400 oscillates following the alternating pulse of the control unit 300.

Further, as shown in FIG. 2, the gap between the first permanent magnet 610 and the second permanent magnet 620 can be arranged smaller than the width of the end face 111 of the first support leg 110, the gap between the third permanent magnet 630 and the fourth permanent magnet 640 can be arranged smaller than the width of the end face 121 of the second support leg 120, so as to ensure that the legs of the U-shaped magnetic yoke 100 have sufficient force on each permanent magnet.

The width of each permanent magnet can be the same as or different from that of the end face of the U-shaped magnetic yoke 100. The width herein refers to the width in the direction indicated by the arrow in FIG. 2.

In order to reduce air gap, as shown in FIG. 2, the end faces 111 and 121 of the first support leg 110 and the second support leg 120 may form a circular arc-surface matching the corresponding circumference when the permanent magnet swings, i.e., the circular arc-surface formed by the end faces 111 and 121 of the first support leg 110 and the second support leg 120 and part of the circular arc-surface of the circumference formed when the permanent magnet swings have only air gap spacing.

Figure 5:
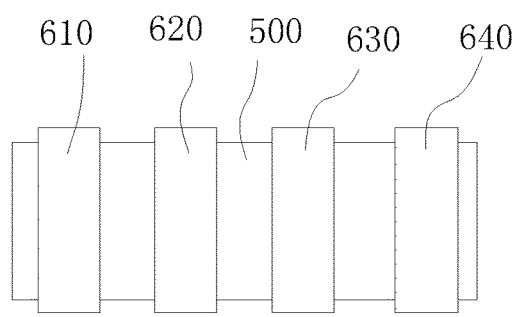
FIG. 5 is a first expansion schematic diagram of the four permanent magnet radial end face in the embodiment shown in FIG. 1.
Figure 6:
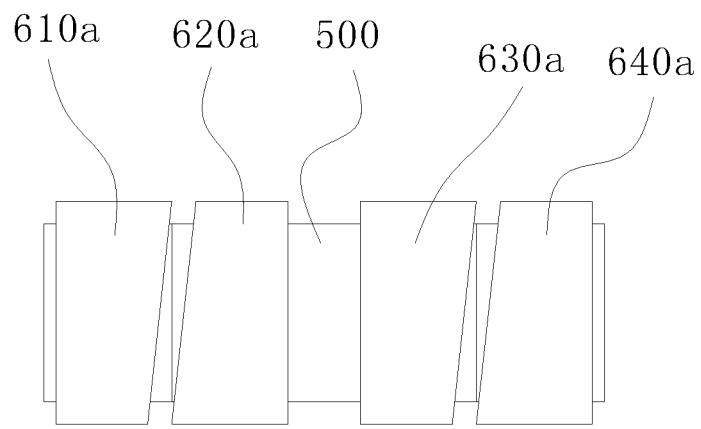
FIG. 6 is a second expansion schematic diagram of the four permanent magnet radial end face in the embodiment shown in FIG. 1.
Figure 7:
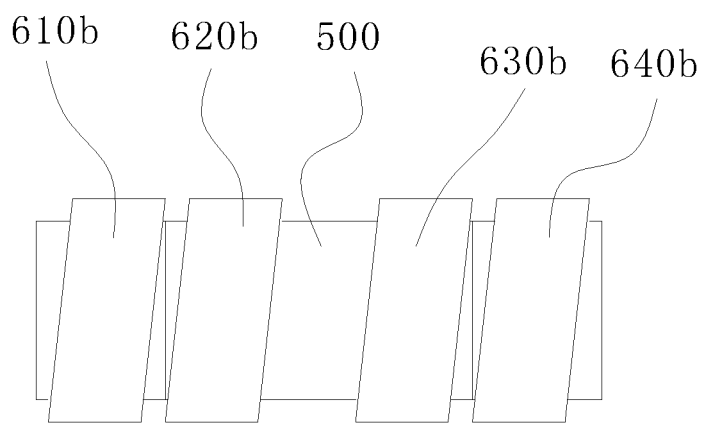
FIG. 7 is a third expansion schematic diagram of the four permanent magnet radial end face in the embodiment shown in FIG. 1.

Referring to FIG. 5, the arrangement of the radial end faces of the four permanent magnets is shown in FIG. 5, which is generally rectangular. In addition, the radial end faces of the permanent magnets can also be set as other shapes, as shown in FIG. 6, the radial end face of the first permanent magnet 610*a* and the second permanent magnet 620*a* are set to be inclined on adjacent side and parallel to each other. The radial end face of the third permanent magnet 630*a* and the fourth permanent magnet 640*a* are set to be inclined on adjacent side and parallel to each other, i.e., the second permanent magnet 620*a* and the fourth permanent magnet 640*a* roughly form a right-angle trapezoid in the same direction. The first permanent magnet 610*a* and the third permanent magnet 630*a* roughly form a right-angle trapezoid of the same shape, but the direction is opposite to that of the second permanent magnet 620*a* and the fourth permanent magnet 640*a*; alternatively, as shown in FIG. 7, the radial end faces of the four permanent magnets are all set to be inclined and parallel to each other, and are all roughly parallelograms.

In the arrangement diagram of the permanent magnets, the permanent magnets are distributed alternately, which can improve the output torque curve and stabilize the output torque.

Further, referring to FIG. 1, the outer arm 430 has a force output part 431 for mounting a corresponding load, for example, the force output part 431 may have an arc-shaped outer wall which can act on the corresponding load to drive the load to swing.

The outer arm 430 of the oscillating arm 400 is an output arm, the external force arm is smaller than the internal force arm. The internal force arm distance is the distance from the radial end face of permanent magnet to the center of oscillating axle 410b, the external force arm distance is the distance from the center of the oscillating axle 410b to the center of the force output part 431 of the output arm 430. The ratio of length between inner arm and outer arm can also be designed according to the requirement of oscillation amplitude.

Figure 8:
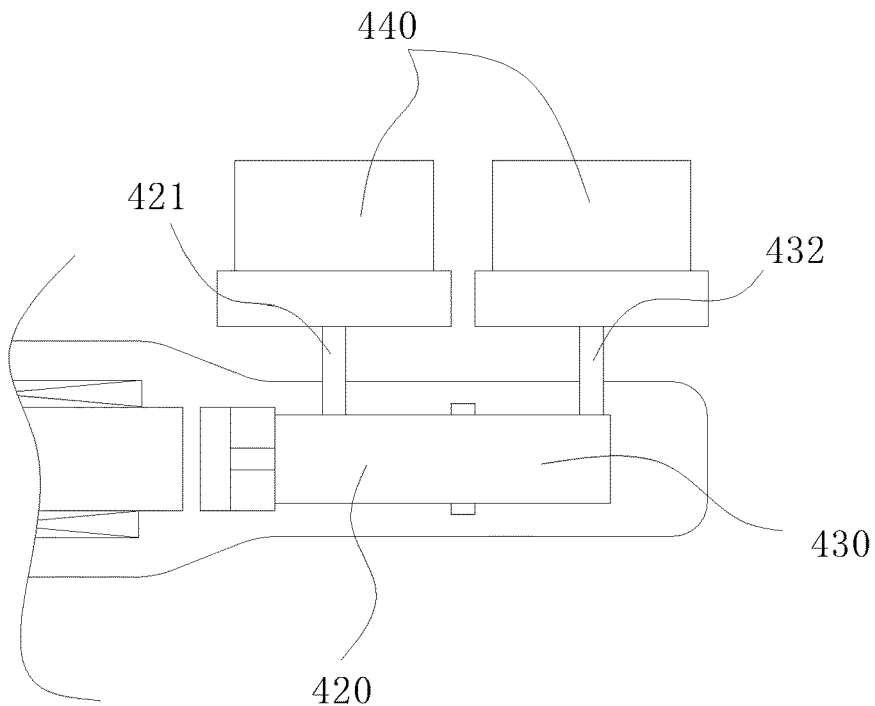
FIG. 8 is a structural schematic diagram of the output part of the oscillating arm in another embodiment shown in FIG. 1.

In addition, referring to FIG. 8, the outer arm 430 and/or inner arm 420 may also be provided with oscillating bars 432, 421 used for force output. The osculating bars 432, 421 are vertical (including the case where the vertical angle is approximately vertical) to the oscillating plane of the oscillating arm 400. When the oscillating arm 400 oscillates, it drives the oscillating bars 432, 421 and the load 440 installed on the oscillating bars 432, 421 to swing.

In the process of each swing, the four permanent magnets are actually subjected to the force swinging in the same direction, the Output torque=Output force X External force arm=(F1+F2+F3+F4) X Internal force arm, and F1, F2, F3 and F4 are the forces of the U-shaped magnetic yoke 100 on the four permanent magnets respectively.

Referring to FIG. 1, in the power-off state of the oscillating motor, the first, second permanent magnet 610, 620 and the first support leg 110 form a closed magnetic circuit through the air gap, and the third, fourth permanent magnet 630, 640 and the second support leg 120 form a closed magnetic circuit through the air gap to avoid magnetic leakage. Moreover, the permanent magnets and the second magnetic yoke 500 are installed on the oscillating arm 400, so that other parts of the oscillating arm 400 will not affect the magnetic field.

In addition, referring to FIG. 1, it may also include a rechargeable battery 310 and a charging module 320, wherein the rechargeable battery 310 is used for power supply, and the charging module 320 is connected with the control unit for charging the rechargeable battery 310.

The control unit may also include a status indicator module 330 for indicating the operating state of the motor, and a switch for triggering a signal to the control unit to control the ON/OFF of the motor.

Further, the control unit 300 can determine the number of mechanical oscillations by counting the energizing pulses of coils, and the output signal gives corresponding indication to the operation condition of the mechanical unit.

The oscillating arm of the oscillating motor swings around the fulcrum, and the service life of the cooperation structure of the fulcrum and the oscillating arm is the service life of the motor. For example, the oscillating arm is installed on the oscillating axle through a bearing, and the service life of the bearing is the service life of the motor, so the service life of the motor is extremely long, which is incomparable to the existing brushed DC motor. Or the oscillating arm can be directly sleeved on the oscillating axle, and the service life of the sleeved structure is the service life of the motor.

The oscillating motor shown in this embodiment can not only drive electric clippers, but also drive various mechanical units that need reciprocating motion with small movement distance. The oscillating motor does not need a cam mechanism or an eccentric connecting rod structure, and has the advantages of low noise, stable current, little current change when oscillation is blocked, and no oscillation frequency change with resistance.

Embodiment 2

Embodiment 2 provides a control method for oscillating motors (hereinafter referred to as the control method), which may be the oscillating motor disclosed in Embodiment 1. The following will first explain the inventive concept of the control method of the present invention.

For an oscillating motor, when it is applied to a specific occasion or made into a specific electrical appliance, its operating voltage, permanent magnets (e.g., first permanent magnet 610, second permanent magnet 620, third permanent magnet 630 and fourth permanent magnet 640), oscillating arm 400 and load are also generally determined.

When observing the oscillating arm of the oscillating motor driving the load to oscillate, the applicant found that the oscillating arm has several different oscillating forms, which can be divided into full-amplitude oscillation, sub-amplitude oscillation and in-situ shaking, etc., as explained in detail below.

Full-amplitude oscillation: refers to the oscillating motor or oscillating arm 400 reciprocating with maximum amplitude; For example, in the embodiment 1 of the oscillating motor, in FIG. 3, the oscillating arm 400 swings to the position of maximum amplitude in one direction, and in FIG. 4, the oscillating arm 400 swings to the position of maximum amplitude in the opposite direction.

Sub-amplitude oscillation: refers to the oscillating motor or oscillating arm 400 reciprocating at an amplitude less than the maximum amplitude. The applicant's research found that this is because when the frequency is too high, the oscillating arm will swing back after receiving the reverse pulse before reaching the maximum amplitude. It will become full-amplitude oscillation when the frequency is lower.

When the load, voltage and control pulse frequency are unchanged, the swing amplitudes of the above two kinds of oscillation are centrosymmetric.

In-situ shaking: refers to the oscillating motor or oscillating arm 400 reciprocating at a stable position with a small amplitude. In the actual process, in order to distinguish the in-situ shaking and the sub-amplitude oscillation, for the centrosymmetric oscillation whose amplitude is smaller than full-amplitude, and can swing back to the center symmetrically when pushed to the maximum oscillation, is defined as sub-amplitude oscillation; for the oscillation that cannot swing back to the center when pushed to the maximum swing position, and can only swing slightly in situ, is defined as in-situ shaking. This is because the driving energy is small, and no matter how high the driving frequency is, it is impossible to swing at full amplitude.

After discovering the above-mentioned oscillation modes of oscillating arm of the oscillating motor, the applicant further studied and found that this was caused by different alternating pulses generated by the control unit 300. The applicant further thinks that for an oscillating motor, when it is applied to a specific occasion or made into a specific electrical appliance, its working voltage, permanent magnets (e.g., first permanent magnet 610, second permanent magnet 620, third permanent magnet 630 and fourth permanent magnet 640, the oscillating arm 400 and the load are also generally determined. The applicant found that there are several meaningful parameters for the alternating pulse at this point, they are: the minimum pulse width Tb of full-amplitude oscillation and its corresponding frequency Fb, the maximum alternating pulse frequency Fa of full-amplitude oscillation, the minimum pulse width Td of start oscillation and its corresponding frequency Fd, these parameters are explained below.

The alternating pulse consists of a forward pulse and a corresponding reverse pulse, and the pulse width of the alternating pulse refers to the width of its forward pulse or reverse pulse. For example, an alternating pulse, first a positive level of 2 ms, then a zero level of 3 ms, then a negative level of 2 ms, then a zero level of 3 ms, thus constitute a complete alternating pulse, and the pulse width of the alternating pulse is the width of its forward pulse or reverse pulse, that is, 2 ms.

When the control unit 300 gives the coils 200 a forward pulse or a reverse pulse so that the oscillating arm 400 can swing to the maximum amplitude position, there is a minimum pulse width. The oscillating arm 400 can be driven to the maximum amplitude position only when the pulse width of the forward pulse/reverse pulse in the alternating pulse is greater than or equal to the minimum pulse width. Otherwise, the oscillating arm 400 cannot be driven to the maximum amplitude position, and the minimum pulse width is defined as the above-mentioned full-amplitude minimum pulse width Tb. The frequency Fb corresponding to the minimum pulse width Tb of the full amplitude refers to the frequency of the full amplitude when the duty ratio of the alternating pulse is 100%, and the pulse width of the forward pulse/reverse pulse is equal to the minimum pulse width Tb of the full amplitude, wherein the duty ratio of the alternating pulse is 100%, which means the duty ratio of the forward pulse/reverse pulse is 100%, so the cycle of the alternating pulse can be calculated to be 2*Tb, therefore the frequency Fb of the alternating pulse is 1/(2*Tb).

When the control unit 300 gives the coils 200 an alternating pulse with a pulse width greater than or equal to the minimum pulse width Tb of full amplitude, in addition to the case where oscillating arm 400 swings to the maximum amplitude position when it makes a reciprocating swing. Another case may occur when the frequency of the alternating pulse increases, that is, the oscillating arm 400 has not reached the maximum amplitude position in the process of being swung to the maximum amplitude position by the forward pulse, while the reverse pulse has arrived, causing the oscillating arm 400 starts to swing in the reverse direction without reaching the maximum amplitude position. At this point, there is a maximum frequency of such an alternating pulse. When the frequency of the alternating pulse is less than or equal to the maximum frequency, the oscillating arm 400 can smoothly swing back and forth to the maximum amplitude position. When the frequency of the alternating pulse is greater than the maximum frequency, the oscillating arm 400 cannot swing back and forth to the maximum amplitude position, which means the oscillating arm will swing reversely before it swings to the maximum amplitude position, that is, it will reciprocate with an amplitude smaller than the maximum amplitude, such a maximum frequency is defined as the above-mentioned maximum alternating pulse frequency Fa of full amplitude.

In summary, when the pulse width of the alternating pulse≥the minimum pulse width Tb of the full amplitude, if 0<the the alternating pulse frequency≤the maximum alternating pulse frequency Fa of full amplitude, the oscillating arm 400 reciprocates in the form of the full amplitude. If the maximum alternating pulse frequency Fa of full amplitude oscillation<the alternating pulse frequency≤frequency Fb, the oscillating arm 400 performs reciprocating oscillation in the form of sub-amplitude oscillation. In both cases, if the pulse width of the alternating pulse is constant, the output torque will remain stable regardless of the frequency.

What has been discussed above is the case where the pulse width of the alternating pulse≥the minimum pulse width Tb of full amplitude, and the case where the pulse width of the alternating pulse<the minimum pulse width Tb of full amplitude will be discussed below.

When the pulse width of the alternating pulse<the minimum pulse width Tb of full amplitude, the electromagnetic force generated by the alternating pulse driving the coils 200 is not sufficient to drive the oscillating arm 400 to swing to the maximum amplitude position, meanwhile, there is also a minimum pulse width that enables the oscillating arm 400 to swing, only when the pulse width of the alternating pulse is greater than the minimum pulse width that enables the swing, can the oscillating arm 400 be driven to swing, otherwise the oscillating arm 400 will stop at its original position, because the electromagnetic force generated by the alternating pulse driving the coils 200 is not sufficient to drive the oscillating arm 400 to start swinging, and the minimum pulse width that enables the swing is defined as the minimum pulse width Td of the above-mentioned start oscillation. Accordingly, the frequency Fd corresponding to the minimum pulse width Td of the start oscillation when the duty ratio of the alternating pulse is 100% can be calculated, and Fd=1/(2*Td).

When the minimum pulse width Td<the pulse width of alternating pulse<the minimum pulse width Tb of full amplitude, and 0<the alternating pulse frequency≤frequency Fd, the oscillating arm 400 reciprocates at the original stop position with a very small amplitude, that is, the oscillating arm reciprocates in the form of in-situ shaking.

Therefore, the law of the alternating pulse for oscillating motor is shown in the following Table (1):

| (1) | | | |
|---|---|---|---|
| Pulse width T of alternating pulse | T ≥ Tb | | Td < T < Tb |
| Frequency F of alternating pulse | 0 < T ≤ Fa | Fa < F ≤ Fb | 0 < F ≤ Fd |
| Oscillation mode | Full-amplitude oscillation | Sub-amplitude oscillation | In-situ shaking |

Figure 9:
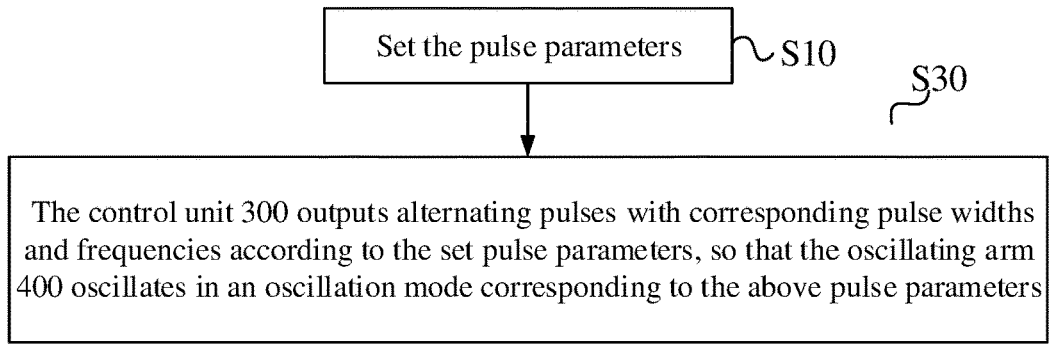
FIG. 9 is a flowchart of the control method for oscillating motors according to an embodiment of the present invention.

After studying and mastering the above laws, the applicant proposes a control method for oscillating motors, which may be the oscillating motors disclosed in Embodiments 1 and 2. Referring to FIG. 9, the control method of this embodiment may include steps S10 to S30, which will be described in detail below.

Figure 10:
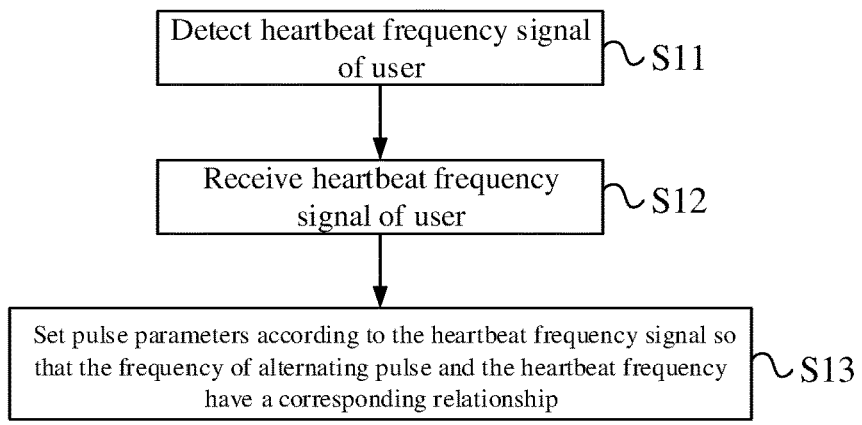
FIG. 10 is a flowchart of the setting pulse parameters according to an embodiment of the present invention.

Step S10: Set the pulse parameters, for example, setting pulse parameters according to the specific application. The step of setting pulse parameters can be preset with factory setting (at the time when application scenario is confirmed), or can be manually set by user or set by receiving detection signal (wired or remote control setting, or set according to sensor signal), or can be automatically set by the oscillating motor according to the load, etc. In one embodiment, please refer to FIG. 10. Step S10 includes Steps S12 and S13, in one embodiment, Step S11 may also be included.

Step S11: Detect heartbeat frequency signal of user. For example, the heartbeat frequency signal of user is detected by sports bracelet, activity tracker or the like.

Step S12: Receive heartbeat frequency signal of user.

Step S13: Set pulse parameters according to the heartbeat frequency signal so that the frequency of alternating pulse and the heartbeat frequency have a corresponding relationship. For example, the corresponding relationship may be an integer multiple relationship, that is, the frequency of alternating pulse is an integer multiple of the heartbeat frequency.

According to the heartbeat induction signal, the oscillation frequency of oscillating motor has a corresponding relation with the heartbeat frequency and changes with the heartbeat, so that the oscillation can better act on human bodies or organisms, or making people or organisms to better feel the oscillation effect.

Step S30: The control unit 300 outputs alternating pulses with corresponding pulse widths and frequencies according to the set pulse parameters, so that the oscillating arm 400 oscillates in an oscillation mode corresponding to the pulse parameters; wherein the oscillation mode comprises at least one of a full-amplitude oscillation mode, a sub-amplitude oscillation mode, an in-situ shaking mode and a composite oscillation mode, wherein the composite oscillation mode is generated by superposition of the full-amplitude oscillation mode and the in-situ shaking mode, or is generated by superposition of the sub-amplitude oscillation mode and the in-situ shaking mode.

In one embodiment, at Step S30, the control unit 300 outputs a first alternating pulse to cause the oscillating arm 400 to reciprocate in a full amplitude oscillation mode; wherein the pulse width of the first alternating pulse is greater than or equal to the minimum pulse width Tb of the full-amplitude oscillation; the frequency of the first alternating pulse is greater than zero and less than or equal to the maximum alternating pulse frequency Fa of the full-amplitude oscillation. In one embodiment, the control unit 300 increases the frequency of the output first alternating pulse, so as to accelerate the frequency of the reciprocating oscillation of the oscillating arm, and the torque is stable.

In one embodiment, at Step S30, the control unit 300 outputs a second alternating pulse to cause the oscillating arm 400 to reciprocate in a sub-amplitude oscillation mode; wherein the pulse width of the second alternating pulse is greater than or equal to the minimum pulse width Tb of the full-amplitude oscillation; the frequency of the second alternating pulse is greater than the maximum alternating pulse frequency Fa of the full-amplitude oscillation, and is less than or equal to the frequency Fb corresponding to the minimum pulse width Tb of the full-amplitude oscillation when the duty ratio of the alternating pulse is 100%, and Fb=1/(2*Tb). In one embodiment, the control unit 300 increases the frequency of the output second alternating pulse, so as to reduce the amplitude of oscillation of the oscillating arm 400, and the torque changes little, i.e., is basically stable.

In one embodiment, at Step S30, when the control unit 300 outputs a first alternating pulse or a second alternating pulse, if the power supply voltage of the oscillating motor becomes smaller or the load of the oscillating motor becomes larger, increasing the pulse width of the alternating pulse output by the control unit 300 is conducive to maintaining the stability of the torque or the amplitude of the oscillating motor.

In one embodiment, at Step S30, the control unit 300 outputs a third alternating pulse to cause the oscillating arm to oscillate in the in-situ shaking mode; wherein the pulse width of the third alternating pulse is less than the minimum pulse width Tb of the full-amplitude oscillation, and is greater than or equal to the minimum pulse width Td of start oscillation; the frequency of the third alternating pulse is greater than 0, and less than or equal to the frequency Fd corresponding to the minimum pulse width Td of start oscillation when the duty ratio of the alternating pulse is 100%, and Fd=1/(2*Td). In one embodiment, the control unit 300 increases the pulse width of the output third alternating pulse to increase the amplitude of oscillation of the oscillating arm 400.

In one embodiment, at Step S30, the control unit 300 outputs a composite alternating pulse consisting of a fourth alternating pulse and a fifth alternating pulse, so that the oscillating arm performs reciprocating oscillation in a composite oscillation mode; wherein the pulse width of the fourth alternating pulse is greater than or equal to the minimum pulse width Tb of the full-amplitude oscillation; the pulse width of the fifth alternating pulse is less than the minimum pulse width Tb of the full-amplitude oscillation, and greater than or equal to the minimum pulse width Td of start oscillation; the frequency of the fifth alternating pulse is greater than 0, and less than or equal to the frequency Fd corresponding to the minimum pulse width Td of start oscillation when the duty ratio of the alternating pulse is 100%, and Fd=1/(2*Td); "the fourth alternating pulse and the fifth alternating pulse form the composite alternating pulse in a form that positive and negative levels do not overlap each other in time sequence", it refers that the fifth alternating pulse is added in the middle of the forward and reverse pulses of the fourth alternating pulse, and the fifth alternating pulse does not overlap with the forward and reverse pulses of the fourth alternating pulse in time sequence. As the composite waveform shown in FIG. 12.

Embodiment 3

This embodiment also proposes an osculating motor for embodiment 2. The basic structure of the osculating motor can be the osculating motor disclosed in embodiment 1, and the control unit 300 of the osculating motor disclosed in embodiment 1 is improved, which will be described in detail below.

The control unit 300 in embodiment 3 is further used for storing the set pulse parameters, it outputs alternating pulses with corresponding pulse widths and frequencies according to the set pulse parameters, so that the oscillating arm oscillates in an oscillation mode corresponding to the pulse parameters; wherein the oscillation mode comprises at least one of a full-amplitude oscillation mode, a sub-amplitude oscillation mode, an in-situ shaking mode and a composite oscillation mode, wherein the composite oscillation mode is generated by superposition of the full-amplitude oscillation mode and the in-situ shaking mode, or is generated by superposition of the sub-amplitude oscillation mode and the in-situ shaking mode.

Figure 11:
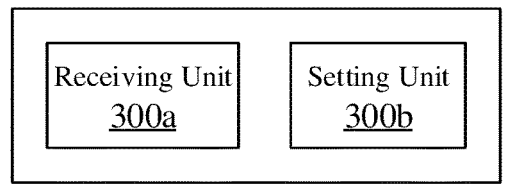
FIG. 11 is a block diagram of the oscillating motor of another embodiment of the present invention.

The set pulse parameters can be set according to the specific application scenario. The step of setting pulse parameters can be preset with factory setting (at the time when application scenario is confirmed), or can be manually set by user or set by receiving detection signal (wired or remote control setting, or set according to sensor signal), or can be automatically set by the oscillating motor according to the load, etc. In one embodiment, referring to FIG. 11, the oscillating motor may further include a receiving unit 300a and a setting unit 300b. The receiving unit 300a is configured to receive a heartbeat frequency signal of user. In one embodiment, the oscillating motor may further include a unit for detecting the heartbeat frequency signal of user, for example, by sports bracelet, activity tracker or the like. The setting unit 300b is configured to set pulse parameters according to the heartbeat frequency signal, so that the alternating pulse frequency and the heartbeat frequency have a corresponding relationship. For example, the corresponding relationship may be an integer multiple relationship, that is, the frequency of alternating pulse is an integer multiple of the heartbeat frequency. A composite frequency signal combined with a multiple low-frequency of heartbeat and a multiple high-frequency of heartbeat may also be used, i.e. there are both multiple low-frequency of heartbeat oscillation and multiple high-frequency of heartbeat in-situ shaking. According to the heartbeat induction signal, the oscillation frequency of oscillating motor has a corresponding relation with the heartbeat frequency and changes with the heartbeat, so that the oscillation can better act on human bodies or organisms, or making people or organisms to better feel the oscillation effect.

In one embodiment, the control unit 300 is used for outputting a first alternating pulse to cause the oscillating arm 400 to reciprocate in a full amplitude oscillation mode; wherein the pulse width of the first alternating pulse is greater than or equal to the minimum pulse width Tb of the full-amplitude oscillation; the frequency of the first alternating pulse is greater than zero and less than or equal to the maximum alternating pulse frequency Fa of the full-amplitude oscillation. In one embodiment, the control unit 300 is used to increase the frequency of the output first alternating pulse, so as to accelerate the frequency of the reciprocating oscillation of the oscillating arm 400, and the torque is stable.

In one embodiment, the control unit 300 is used for outputting a second alternating pulse to cause the oscillating arm 400 to reciprocate in a sub-amplitude oscillation mode; wherein the pulse width of the second alternating pulse is greater than or equal to the minimum pulse width Tb of the full-amplitude oscillation; the frequency of the second alternating pulse is greater than the maximum alternating pulse frequency Fa of the full-amplitude oscillation, and is less than or equal to the frequency Fb corresponding to the minimum pulse width Tb of the full-amplitude oscillation when the duty ratio of the alternating pulse is 100%, and $Fb=1/(2*Tb)$. In one embodiment, the control unit 300 is used to increase the frequency of the output second alternating pulse, so as to reduce the amplitude of oscillation of the oscillating arm 400, and the torque changes little, i.e., is basically stable.

In one embodiment, when the control unit 300 is used to output a first alternating pulse or a second alternating pulse, if the power supply voltage of the oscillating motor becomes smaller or the load of the oscillating motor becomes larger, increasing the pulse width of the alternating pulse output by the control unit 300 is conducive to maintaining the stability of the torque and the amplitude of the oscillating motor.

In one embodiment, the control unit 300 is used to output a third alternating pulse to cause the oscillating arm 400 to oscillate in the in-situ shaking mode; wherein the pulse width of the third alternating pulse is less than the minimum pulse width Tb of the full-amplitude oscillation, and is greater than or equal to the minimum pulse width Td of start oscillation; the frequency of the third alternating pulse is greater than 0, and less than or equal to the frequency Fd corresponding to the minimum pulse width Td of start oscillation when the duty ratio of the alternating pulse is 100%, and $Fd=1/(2*Td)$. In one embodiment, the control unit 300 is used to increase the pulse width of the output third alternating pulse to increase the amplitude of oscillation of the oscillating arm 400.

In one embodiment, the control unit 300 is used to output a composite alternating pulse consisting of a fourth alternating pulse and a fifth alternating pulse, so that the oscillating arm performs reciprocating oscillation in a composite oscillation mode; wherein the pulse width of the fourth alternating pulse is greater than or equal to the minimum pulse width Tb of the full-amplitude oscillation; the pulse width of the fifth alternating pulse is less than the minimum pulse width Tb of the full-amplitude oscillation, and greater than or equal to the minimum pulse width Td of start oscillation; the frequency of the fifth alternating pulse is greater than 0, and less than or equal to the frequency Fd corresponding to the minimum pulse width Td of start oscillation when the duty ratio of the alternating pulse is 100%, and $Fd=1/(2*Td)$; "the fourth alternating pulse and the fifth alternating pulse form the composite alternating pulse in a form that positive and negative levels do not overlap each other in time sequence", it refers that the fifth alternating pulse is added in the middle of the forward and reverse pulses of the fourth alternating pulse, and the fifth alternating pulse does not overlap with the forward and reverse pulses of the fourth alternating pulse in time sequence. As the composite waveform shown in FIG. 12.

The control method and the oscillating motor disclosed by the invention have wide application.

For example, the present invention can be applied to the aspect of simulating biology. For example, the invention can be applied to the swing of simulated wings, such as the wings of simulated birds, mosquitoes, flies, dragonflies and other organisms. Since the oscillating motor works in full-amplitude oscillation mode or sub-amplitude oscillation mode, it can rapidly change the oscillation frequency, and the torque is stable, realizing rapid change of position. Therefore, in the specific implementation, a detection sensor can be introduced to the oscillating motor to detect signals such as infrared rays, ultrasonic waves or microwaves. The control unit 300 sets and changes its pulse parameters according to the detection sensor, and outputs alternating pulses with pulse parameters corresponding to pulse width and frequency, so as to realize sharp change of oscillation frequency, and change of position. When the oscillating motor works in the sub-amplitude oscillation mode, the oscillation frequency becomes higher, and its swing amplitude will become smaller, but the torque is stable. The invention is applied to drive the biological wings, which is the most lifelike method for simulating the biological wings. Because it is directly driven by oscillating motor, it does not need eccentric connecting rod to be converted into swing as rotating motor does, and because rotating motor has rated rotating speed, its swing variation range is very small, which also does not conform to the motion state of wings. The invention can also be applied to simulated organisms, and a composite frequency signal combining a multiple low-frequency of heartbeat and a multiple high-frequency of heartbeat is adopted, which not only has multiple low frequency oscillation of heartbeat, but also has multiple high-frequency in-situ shaking of heartbeat, with a fixed oscillation direction, thus appearing heartbeat feeling, unlike the existing simulated organism, which use eccentric wheel rotating motor to vibrate without direction and swing, and is only related to the rated speed of the motor, and the variation range of speed is very small.

Figure 12:
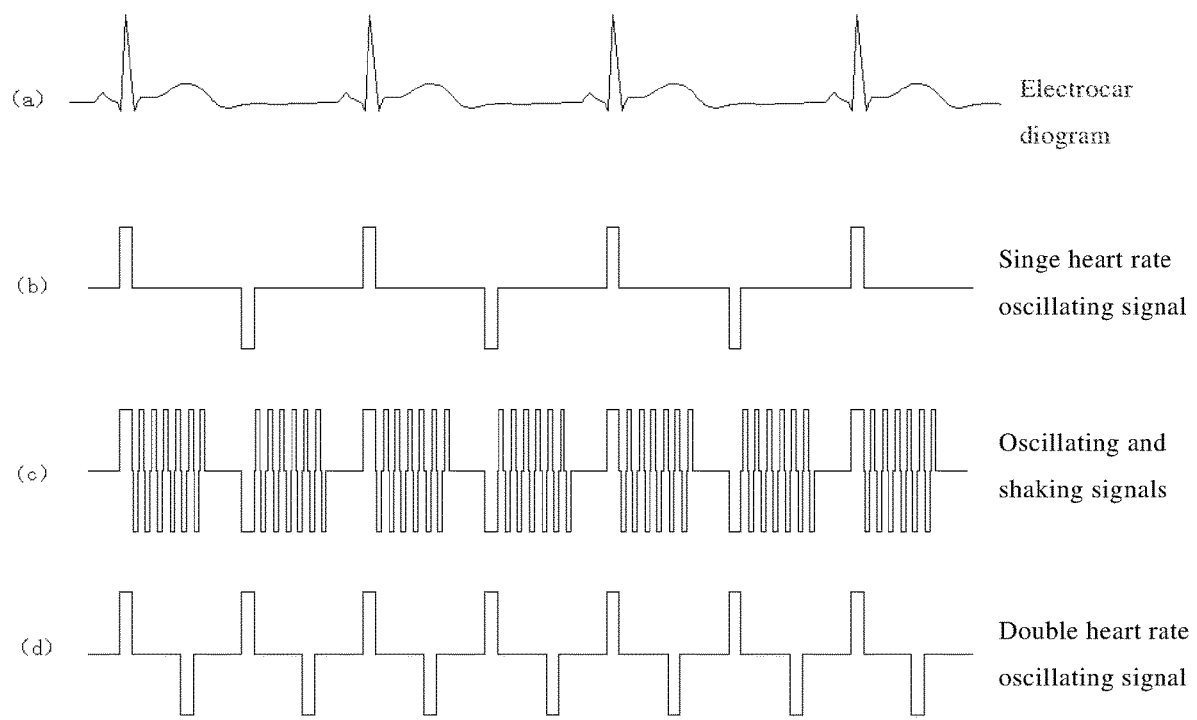
FIG. 12 shows several examples of an embodiment, wherein (a) is an electrocardiogram, (b) is a single heart rate oscillating frequency signal, (c) is a composite alternating pulse, (d) is a double heart rate oscillating frequency signal.

For example, the present invention can also be used for medical and health care equipment. The applicant found that the state of a human being or other living organism has a certain relationship with its heartbeat frequency. This is also in line with the fact that Chinese medicine varies from person to person and suits the remedy to the case. That is, each individual is different, and the same individual is also different in different periods. The heartbeat is different from person to person, and the heartbeat of the same person is also different in different states. The same is true of other creatures. According to the heartbeat induction signal, the oscillation frequency of oscillating motor has a corresponding relation with the heartbeat frequency and changes with the heartbeat, so that the oscillation can better act on human bodies or organisms, or making people or organisms to better feel the oscillation effect. For example, as the detected electrocardiogram shown in FIG. 12, the drive pulse of the oscillating motor may be set to an alternating pulse of single heart rate oscillating frequency as shown in FIG. 12 or an alternating pulse of double heart rate oscillating frequency as shown in FIG. 12, or the drive pulse of the oscillating motor may also be set to a composite alternating pulse as shown in FIG. 12, wherein the composite alternating pulse shown in FIG. 12 consists of an alternating pulse of a single heart rate oscillating frequency with a pulse width that can enable the motor to swing at full amplitude or sub amplitude, and a plurality of alternating pulses that enable the motor to shake in situ. When considering a specific application scenario, the invention can be applied to a pulse type flusher, the oscillating motor adopts a frequency corresponding to heartbeat, acts on a diaphragm pump, and can be used to wash teeth, gums, wounds, cavities and the like. The invention is applied to a massager, and the oscillating motor acts on massaging head, adopts a frequency corresponding to the heartbeat, acts on skin or acupuncture points, and realizes a heartbeat feeling. The invention is applied to an acupuncture controller, it controls the shaking and beating of the needle during acupuncture and moxibustion treatment, and uses a frequency corresponding to the heartbeat to exert an effect on acupuncture points.

The above applications of specific embodiments are only to illustrate the present invention for the purpose to help comprehension, and are not intended to limit the present invention. For those skilled in the art, changes may be made to the above specific embodiments according to the concept of the present invention.

The invention claimed is:

1. A control method for oscillating motor, the oscillating motor comprises a U-shaped magnetic yoke, a control unit, an oscillating arm oscillating around a fulcrum, a second magnetic yoke and four permanent magnets; the U-shaped magnetic yoke has a first support leg and a second support leg, and the first support leg and the second support leg are respectively wound with coils; the control unit is electrically connected with coils and produces alternating pulses to generate alternating magnetic poles on the end faces of the two supporting legs of the U-shaped magnetic yoke; the oscillating arm extends outward from the end face direction of the U-shaped magnetic yoke and is bounded by the fulcrum, the end of the oscillating arm close to the U-shaped magnetic yoke is an inner arm, the end of the oscillating arm away from the U-shaped magnetic yoke is an outer arm; the second magnetic yoke is installed at the end of the inner arm close to the U-shaped magnetic yoke; the permanent magnets are fixedly installed on the second magnetic yoke; the four permanent magnets are arranged side by side in sequence, they are: a first permanent magnet, a second permanent magnet, a third permanent magnet and a fourth permanent magnet, according to the arrangement order; the outer end faces of the first permanent magnet and the fourth permanent magnet are of the same polarity, and the outer end faces of the second permanent magnet and the third permanent magnet are of the same polarity; and the outer end faces of the first permanent magnet and the second permanent magnet are of the opposite polarity and arranged corresponding to the end face of the first support leg; the outer end faces of the third permanent magnet and the fourth permanent magnet are of the opposite polarity and arranged corresponding to the end face of the second support leg; there is an air gap between the end faces of the permanent magnets and their corresponding support legs, and alternating magnetic poles generated by the two supporting legs of the U-shaped magnetic yoke cause the permanent magnets, the second magnetic yoke and the oscillating arm to reciprocate;

characterized in that:

setting pulse parameters;

the control unit outputs alternating pulses with corresponding pulse widths and frequencies according to the set pulse parameters, so that the oscillating arm oscillates in an oscillation mode corresponding to the pulse parameters; wherein the oscillation mode comprises at least one of a full-amplitude oscillation mode, a sub-amplitude oscillation mode, an in-situ shaking mode and a composite oscillation mode, wherein the composite oscillation mode is generated by superposition of the full-amplitude oscillation mode and the in-situ shaking mode, or is generated by superposition of the sub-amplitude oscillation mode and the in-situ shaking mode.

2. The control method of claim 1, characterized in that the control unit outputs a first alternating pulse to cause the oscillating arm to reciprocate in a full-amplitude oscillation mode; wherein the pulse width of the first alternating pulse is greater than or equal to the minimum pulse width Tb of the full-amplitude oscillation; the frequency of the first alternating pulse is greater than zero and less than or equal to the maximum alternating pulse frequency Fa of the full-amplitude oscillation.

3. The control method of claim 2, characterized in that the control unit increases the frequency of the output first alternating pulse to accelerate the frequency of the reciprocating oscillation of the oscillating arm.

4. The control method of claim 2, characterized in that, when the power supply voltage of the oscillating motor becomes smaller or the load of the oscillating motor becomes larger, the pulse width of the alternating pulse output by the control unit is increased.

5. The control method of claim 1, characterized in that the control unit outputs a second alternating pulse to cause the oscillating arm to reciprocate in a sub-amplitude oscillation mode; wherein the pulse width of the second alternating pulse is greater than or equal to the minimum pulse width Tb of the full-amplitude oscillation; the frequency of the second alternating pulse is greater than the maximum alternating pulse frequency Fa of the full-amplitude oscillation, and is less than or equal to the frequency of Fb corresponding to the minimum pulse width Tb of the full-amplitude oscillation when the duty ratio of the alternating pulse is 100%, and Fb=1/(2*Tb).

6. The control method of claim 5, characterized in that the control unit increases the frequency of the output second alternating pulse to reduce the amplitude of oscillation of the oscillating arm.

7. The control method of claim 1, characterized in that the control unit outputs a third alternating pulse to cause the oscillating arm to oscillate in the in-situ shaking mode; wherein the pulse width of the third alternating pulse is less than the minimum pulse width Tb of the full-amplitude oscillation, and is greater than or equal to the minimum pulse width Td of start oscillation; the frequency of the third alternating pulse is greater than 0, and less than or equal to the frequency Fd corresponding to the minimum pulse width Td of start oscillation when the duty ratio of the alternating pulse is 100%, and Fd=1/(2*Td).

8. The control method of claim 7, wherein the control unit increases the pulse width of the output third alternating pulse to increase the amplitude of oscillation of the oscillating arm.

9. The control method as claimed in claim 1, characterized in that the control unit outputs a composite alternating pulse consisting of a fourth alternating pulse and a fifth alternating pulse, so that the oscillating arm reciprocates in a composite oscillation mode;
   wherein the pulse width of the fourth alternating pulse is greater than or equal to the minimum pulse width Tb of the full-amplitude oscillation;
   the pulse width of the fifth alternating pulse is less than the minimum pulse width Tb of the full-amplitude oscillation, and is greater than or equal to the minimum pulse width Td of start oscillation; the frequency of the fifth alternating pulse is greater than 0, and less than or equal to the frequency Fd corresponding to the minimum pulse width Td of start oscillation when the duty ratio of the alternating pulse is 100%, and Fd=1/(2*Td);
   the fourth alternating pulse and the fifth alternating pulse form the composite alternating pulse in a form that positive and negative levels do not overlap each other in time sequence.

10. The control method of claim 1, wherein the setting of pulse parameters comprises:
   detecting and/or receiving a user's heartbeat frequency signal;
   setting pulse parameters according to the heartbeat frequency signal, so that the frequency of the alternating pulse and the heartbeat frequency have a corresponding relationship.

11. An oscillating motor, the oscillating motor comprises a U-shaped magnetic yoke, a control unit, an oscillating arm oscillating around a fulcrum, a second magnetic yoke and four permanent magnets; the U-shaped magnetic yoke has a first support leg and a second support leg, and the first support leg and the second support leg are respectively wound with coils; the control unit is electrically connected with coils and produces alternating pulses to generate alternating magnetic poles on the end faces of the two supporting legs of the U-shaped magnetic yoke; the oscillating arm extends outward from the end face direction of the U-shaped magnetic yoke and is bounded by the fulcrum, the end of the oscillating arm close to the U-shaped magnetic yoke is an inner arm, the end of the oscillating arm away from the U-shaped magnetic yoke is an outer arm; the second magnetic yoke is installed at the end of the inner arm close to the U-shaped magnetic yoke; the permanent magnets are fixedly installed on the second magnetic yoke; the four permanent magnets are arranged side by side in sequence, they are: a first permanent magnet, a second permanent magnet, a third permanent magnet and a fourth permanent magnet, according to the arrangement order; the outer end faces of the first permanent magnet and the fourth permanent magnet are of the same polarity, and the outer end faces of the second permanent magnet and the third permanent magnet are of the same polarity; and the outer end faces of the first permanent magnet and the second permanent magnet are of the opposite polarity and arranged corresponding to the end face of the first support leg; the outer end faces of the third permanent magnet and the fourth permanent magnet are of the opposite polarity and arranged corresponding to the end face of the second support leg; there is an air gap between the end faces of the permanent magnets and their corresponding support legs, and alternating magnetic poles generated by the two supporting legs of the U-shaped magnetic yoke cause the permanent magnets, the second magnetic yoke and the oscillating arm to reciprocate;
   characterized in that: the control unit is further used for storing the set pulse parameters, and outputting alternating pulses with corresponding pulse widths and frequencies according to the set pulse parameters, so that the oscillating arm oscillates in an oscillation mode corresponding to the pulse parameters; wherein the oscillation mode comprises at least one of a full-amplitude oscillation mode, a sub-amplitude oscillation mode, an in-situ shaking mode and a composite oscillation mode, wherein the composite oscillation mode is generated by superposition of the full-amplitude oscillation mode and the in-situ shaking mode, or is generated by superposition of the sub-amplitude oscillation mode and the in-situ shaking mode.

12. The oscillating motor of claim 11, characterized in that the control unit is used for outputting a first alternating pulse to cause the oscillating arm to reciprocate in a full-amplitude oscillation mode; wherein the pulse width of the first alternating pulse is greater than or equal to the minimum pulse width Tb of the full-amplitude oscillation; the frequency of the first alternating pulse is greater than zero and less than or equal to the maximum alternating pulse frequency Fa of the full-amplitude oscillation.

13. The oscillating motor of claim 11, characterized in that the control unit is used for outputting a second alternating pulse to cause the oscillating arm to reciprocate in a sub-amplitude oscillation mode; wherein the pulse width of the second alternating pulse is greater than or equal to the minimum pulse width Tb of the full-amplitude oscillation; the frequency of the second alternating pulse is greater than the maximum alternating pulse frequency Fa of the full-amplitude oscillation, and is less than or equal to the frequency Fb corresponding to the minimum pulse width Tb of the full-amplitude oscillation when the duty ratio of the alternating pulse is 100%, and Fb=1/(2*Tb).

14. The oscillating motor of claim 11, characterized in that the control unit is used for outputting a third alternating pulse to cause the oscillating arm to oscillate in the in-situ shaking mode; wherein the pulse width of the third alternating pulse is less than the minimum pulse width Tb of the full-amplitude oscillation, and is greater than or equal to the minimum pulse width Td of start oscillation; the frequency of the third alternating pulse is greater than 0, and less than or equal to the frequency Fd corresponding to the minimum pulse width Td of start oscillation when the duty ratio of the alternating pulse is 100%, and Fd=1/(2*Td).

15. The oscillating motor of claim 11, characterized in that,
   the control unit is used for outputting a composite alternating pulse consisting of a fourth alternating pulse and a fifth alternating pulse, so that the oscillating arm performs reciprocating oscillation in a composite oscillation mode; wherein the pulse width of the fourth alternating pulse is greater than or equal to the minimum pulse width Tb of the full-amplitude oscillation; the pulse width of the fifth alternating pulse is less than the minimum pulse width Tb of the full-amplitude oscillation, and greater than or equal to the minimum pulse width Td of start oscillation; the frequency of the fifth alternating pulse is greater than 0, and less than or equal to the frequency Fd corresponding to the minimum pulse width Td of start oscillation when the duty ratio of the alternating pulse is 100%, and $Fd=1/(2*Td)$; the fourth alternating pulse and the fifth alternating pulse form the composite alternating pulse in a form that positive and negative levels do not overlap each other in time sequence.

16. The oscillating motor of claim 11, characterized in that it further comprises a receiving unit and a setting unit, the receiving unit is used for receiving user's heartbeat frequency signal, the setting unit is used for setting pulse parameters according to the heartbeat frequency signal, so that the frequency of the alternating pulse and the heartbeat frequency have a corresponding relationship.

* * * * *